Oct. 8, 1935.  F. W. CRAMER  2,016,414
METHOD AND APPARATUS FOR ELECTRIC WELDING
Filed Nov. 20, 1931  6 Sheets-Sheet 6
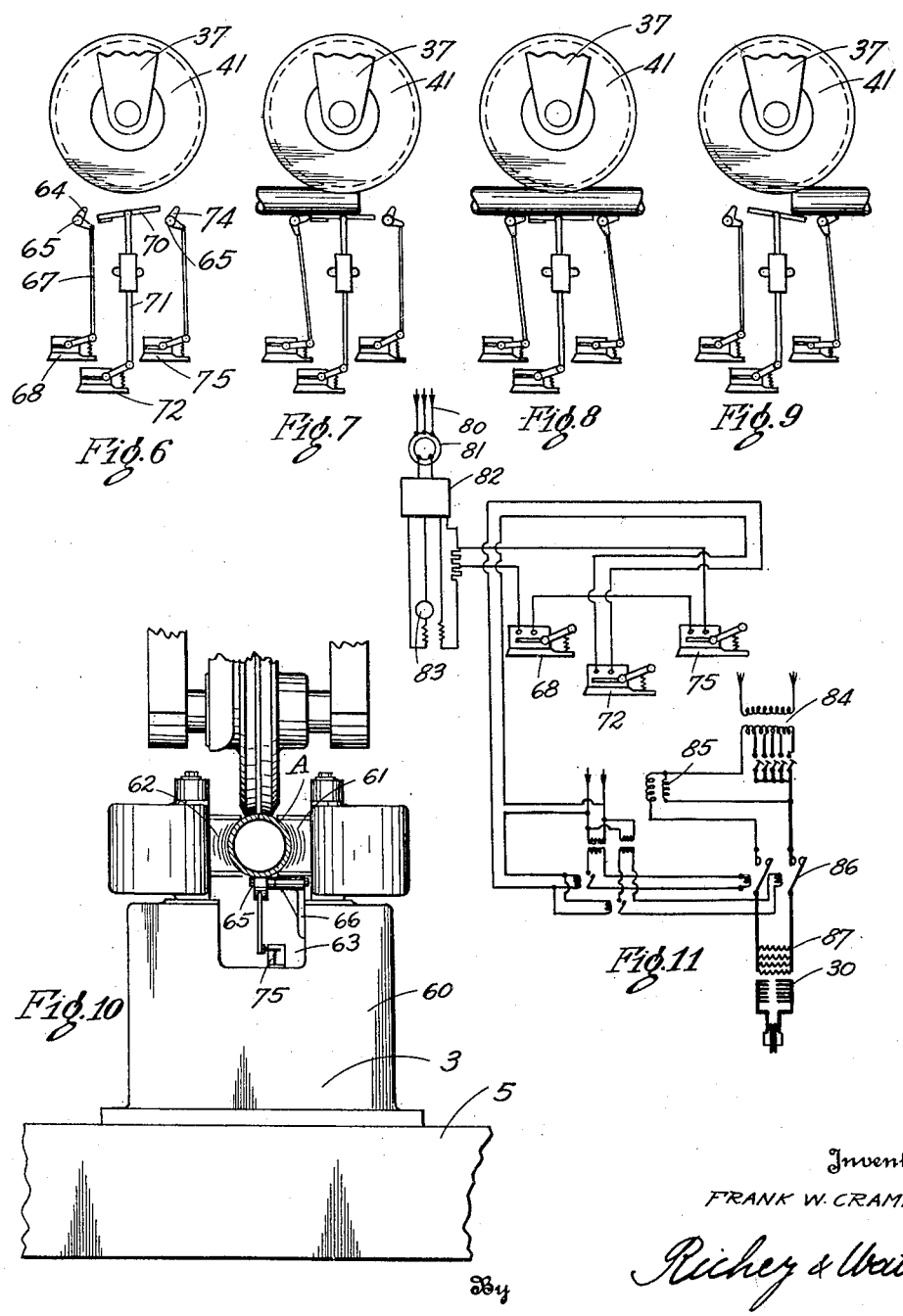

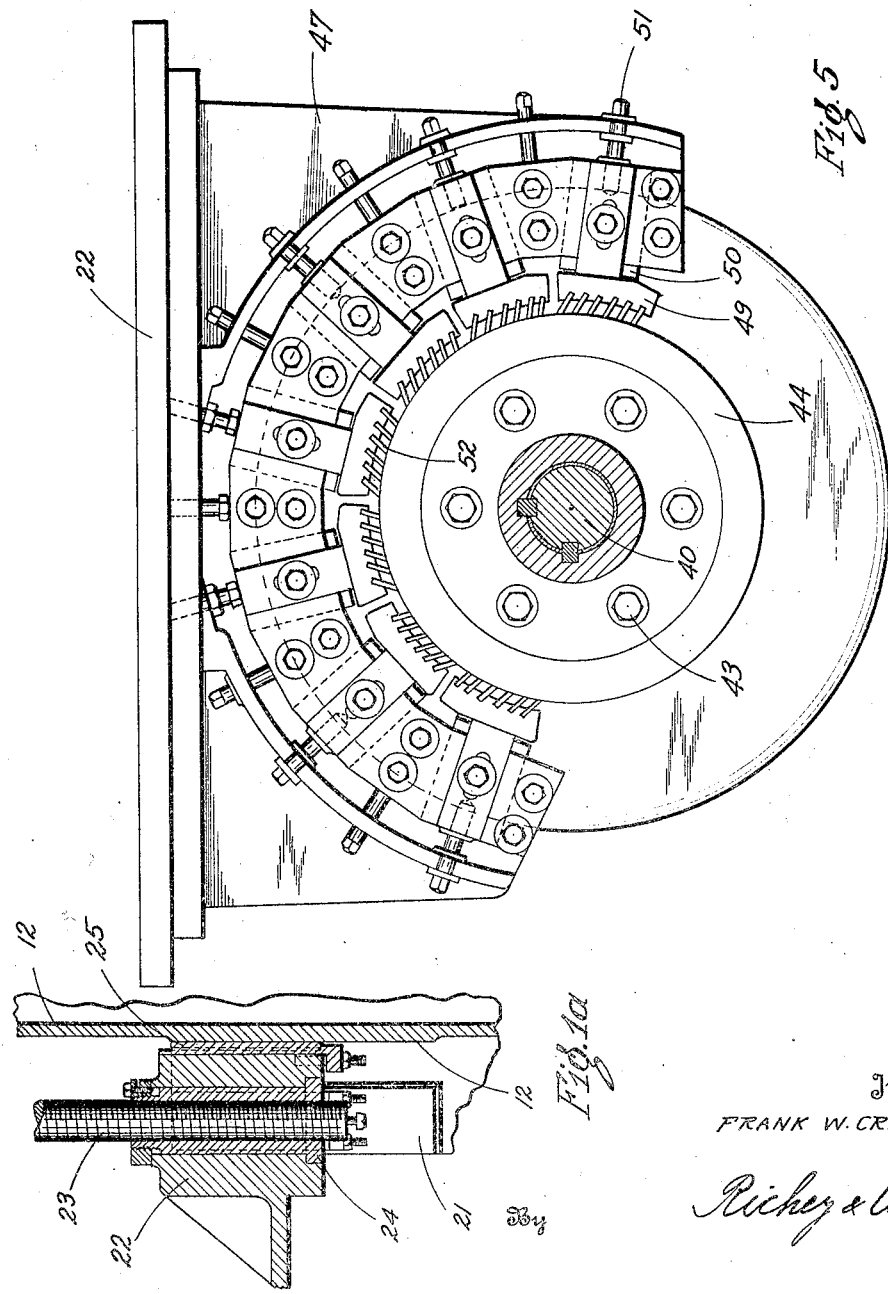

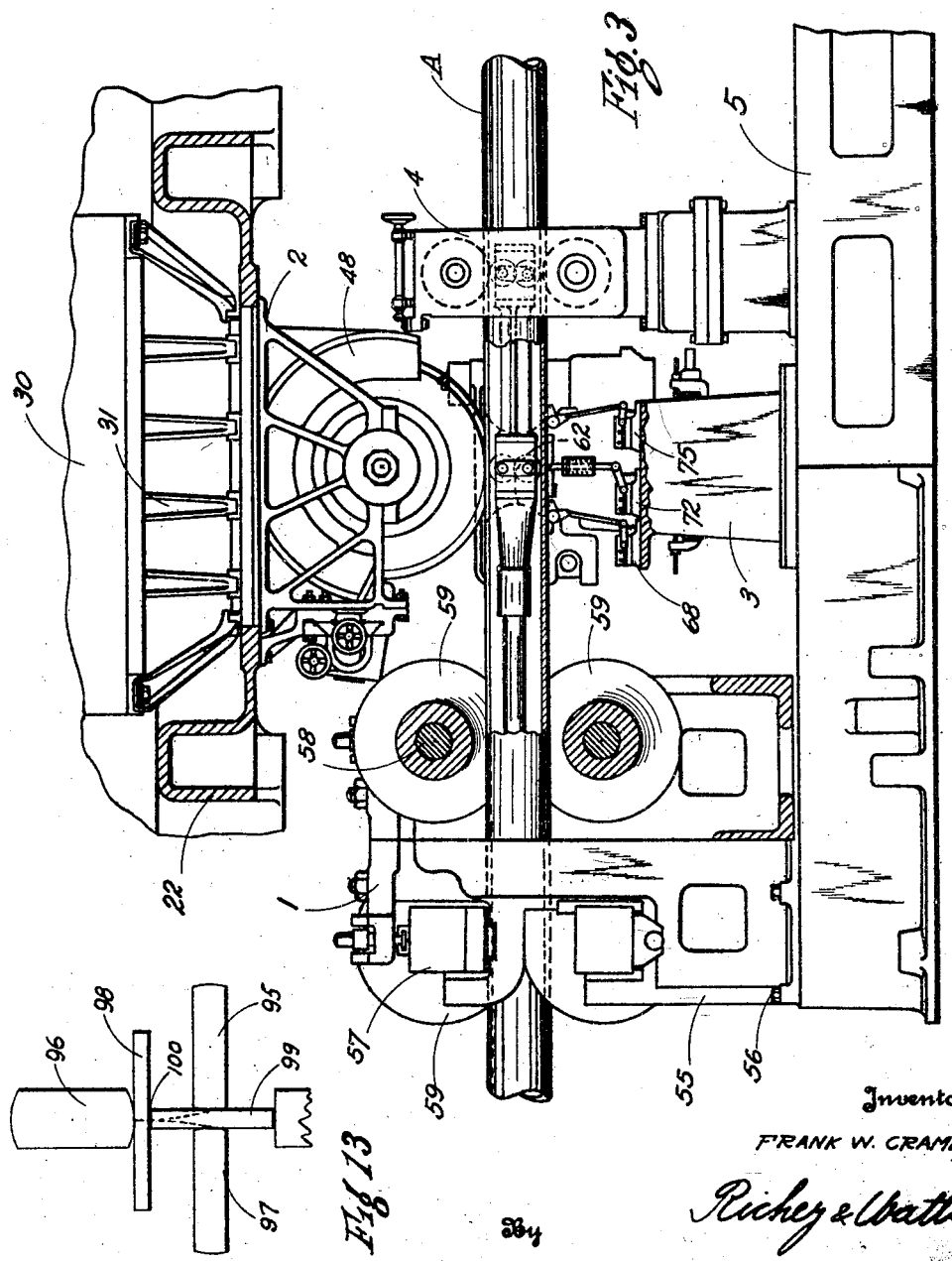

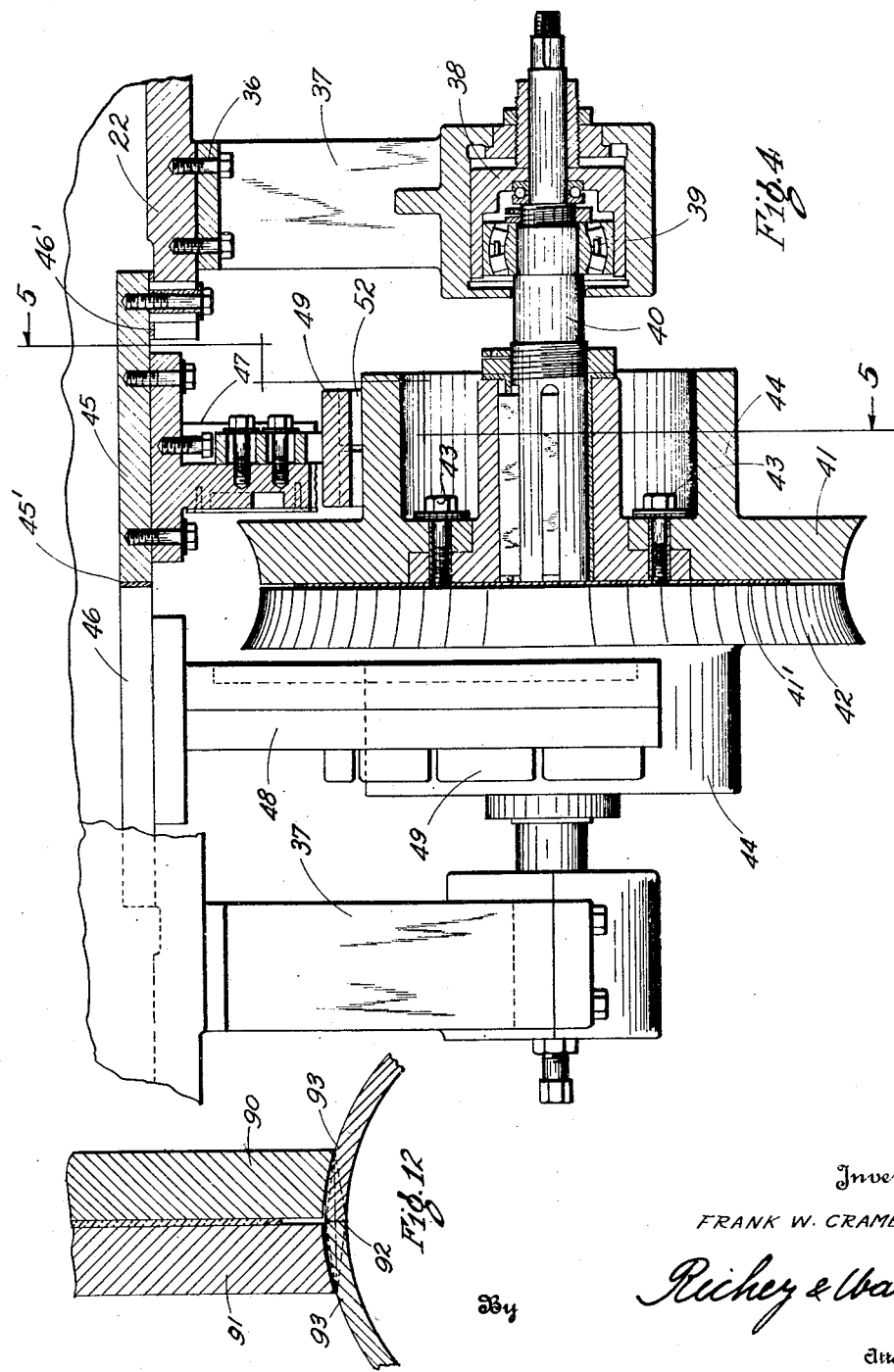

Patented Oct. 8, 1935

2,016,414

UNITED STATES PATENT OFFICE 2,016,414

METHOD AND APPARATUS FOR ELECTRIC WELDING

Frank W. Cramer, Youngstown, Ohio, assignor to Republic Steel Corporation, a corporation of New Jersey Application November 20, 1931, Serial No. 576,260

8 Claims. (Cl. 219—6)

This invention relates to the art of electrically welding metallic articles. It relates more particularly to an improved welded article and a method and apparatus adaptable for use in the manufacture of heavy gauge, large diameter pipe.

By the term "heavy gage, large diameter pipe" as used herein I mean ferrous metal tubular articles having wall thicknesses from about .125 inch upward to ⅜th inch or even more, and diameters from about 4 inches to about 16 inches or more.

This invention involves the use of a welding machine, for example, of the general type described in Patent No. 1,388,434 to Johnson which in the past has been used in the manufacture of small, thin gauge tubing by the continuous process of employing electric resistance welding, but in addition contemplates the provision of improvements which are necessary to make such a machine adaptable to the manufacture of pipe of considerable wall thickness and adapted for the transmission of fluids.

A number of factors effect the manufacture of pipe of considerable wall thickness. In the first place the material worked upon is distinctly different from that handled by the Johnson machine. In the latter, reels of thin gauge strips were fed successively through forming and welding rolls. The ends of the successive reels may even be joined together so that there need be no interruption in the operation of the machine. In making the heavier wall larger diameter pipes, the metal is initially in the form of flat plates because of the difficulty, if not the impossibility, of making such large plates in continuous lengths. The amount of electric current required to weld heavy wall pipe when compared with that required for the welding of thin gauge tubing was such that perplexing problems were encountered in providing a method and apparatus capable of supplying the enormous current necessary to the edges of the seam to be welded.

In accordance with this invention feed rolls are provided forward of the welding throat of the welder which receive a pipe blank from suitable guide rolls and drives it along its path through the welding throat and subsequent devices. The welder includes electrode rolls for engaging the exterior walls of the formed pipe blank on opposite sides of the open seam for supplying electric current thereto from a transformer connected to a suitable source of current. The feed-in rolls are driven at a speed corresponding to the desired rate of pipe travel and suitable mechanism is provided operable by the pipe to control the speed of these rolls and the speed of the pipe passing the electrodes. Pressure rolls are positioned below the electrodes to insure that the edges of the formed pipe will be forced together to effect the weld. After the weld has been completed, the pipe passes through planishing rolls which smooth down the burr thrown up during welding.

The apparatus for supplying current to the electrode rolls includes a step down transformer co-operating with a voltage regulator and supported on a carriage above the pressure rolls. The voltage regulator is effective in regulating the amount of current introduced into the pipe blank. The carriage is mounted so as to be adjustable vertically on a frame resting on a suitable base. Angularly disposed brushes carried by the adjustable brush holders are adapted to engage approximately 180 degrees of the hubs of the electrodes. It is, therefore, desirable to provide a welding mechanism wherein three important elements necessary in the welding of pipe blank seams, namely, pressure, current and speed of pipe, can be adjustable as to compensate for any irregularities in any or all of these elements. It is a still further object of this invention to provide an electrode structure which when adjusted to the desired position will be of such rigidity as to be insusceptible of movement by the passage of the pipe blank through the welding throat.

In the welding of heavy gauge large diameter ferrous metal pipe great difficulty has been experienced in getting a weld which extended throughout the radial width of the abutting surfaces of the seam to be welded. The seam was welded either at just one edge of the abutting surfaces or at the mid-portion of the seam, but not throughout the extent of the abutting surfaces as was desired.

I have found that the seam edges of a thick, large diameter ferrous metal pipe blank may be welded together thruout their full radial lengths by a substantially uniform heating of the seam edges. I have attained such uniform heating by locating points on the exterior surface of the blank approximately equi-distant from the radial extremities of the seam edges and constituting them effective centers of current distribution to the seam edges. The electrodes surfaces should be of such length as measured circumferentially of the blank as will include these points, and such surfaces should be so shaped that when pressed against the blank the said points will lie in areas from which current effectively flows to all parts of the radial length of the seam. The electrodes may, and preferably do, bear most heavily on the blank closely adjacent to said points.

In the case of composite or bimetallic pipes where metals of different resistances are to be welded the aforesaid points should be so located as will make substantially equal the resistances in the paths therefrom to the radial extremities of the seam edges.

In the drawings:

Figure 1a is a fragmentary sectional view illustrating a slide in which is mounted one corner of the carriage.

Figure 3 is a side elevation partly broken away illustrating a welding apparatus embodying my invention.

Figure 4 is a front view partly in elevation and partly in section showing the electrode rolls, the bearings therefor and the bearing supports.

Figure 5 is a sectional view taken on a plane through the line 5—5 of Figure 4.

Figure 1:
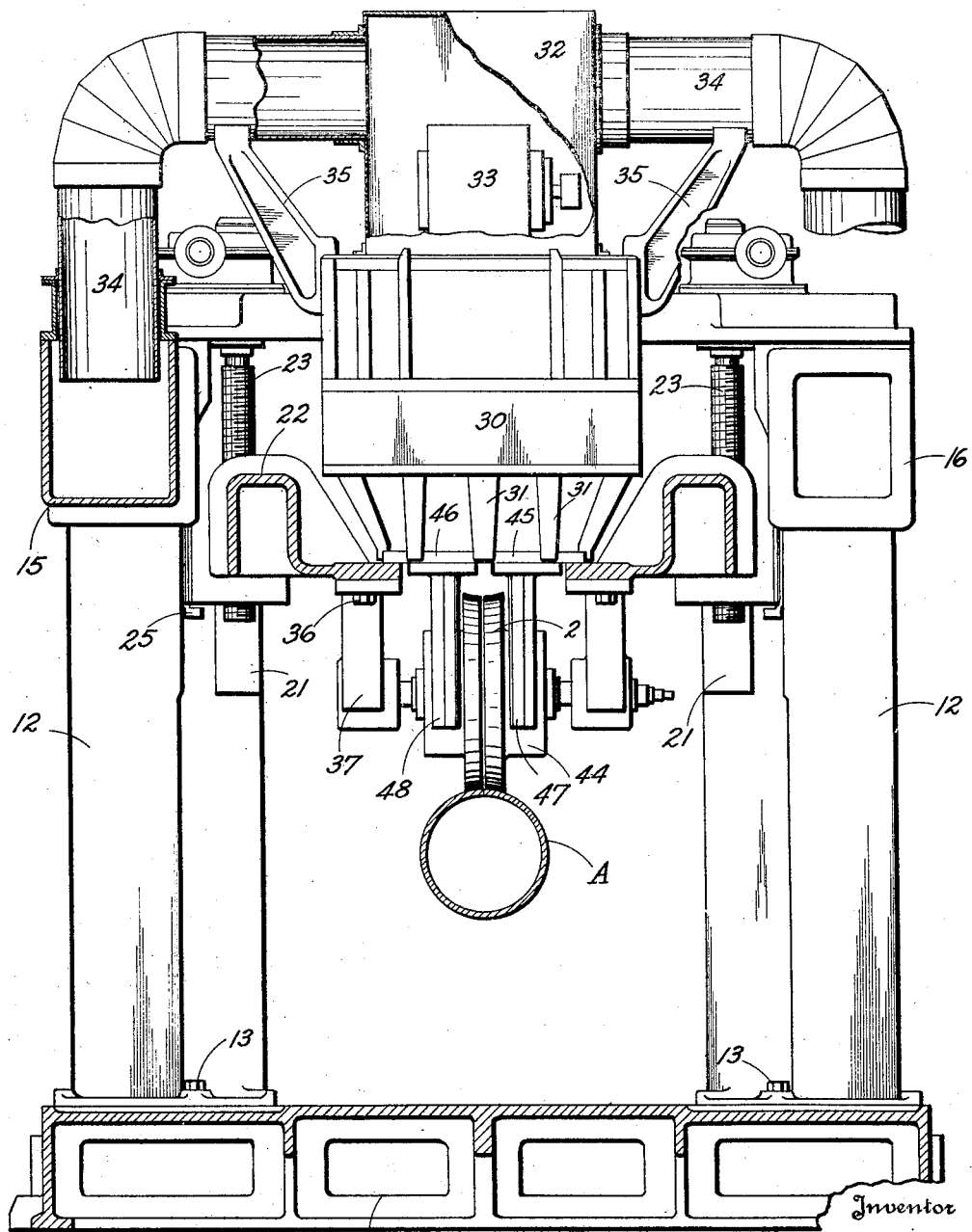
Figure 1 is a front elevation of the welding apparatus illustrating the transformer, electrode rolls and the carriage therefor.

Figures 6 to 9 inclusive are diagrammatic views illustrating means for automatically controlling the welding current by the pipe passing under the electrodes.

Figure 10 is a fragmentary elevation of the welding machine illustrating the circuit control apparatus with relation to the pressure rolls.

Figure 11 is a circuit diagram including the control switches, transformer and electrodes.

Figure 12 is a fragmentary view of a pair of electrodes engaging a portion of a pipe blank.

Figure 13 is a diagrammatic view of a welding throat wherein my invention is carried out.

With reference to the drawings, and particularly Figure 3 there is illustrated a welding apparatus embodying my invention which includes a stand of feed-in rolls 1, welder 2, pressure roll stand 3 and planishing unit 4, all supported on a suitable base 5.

Figure 2:
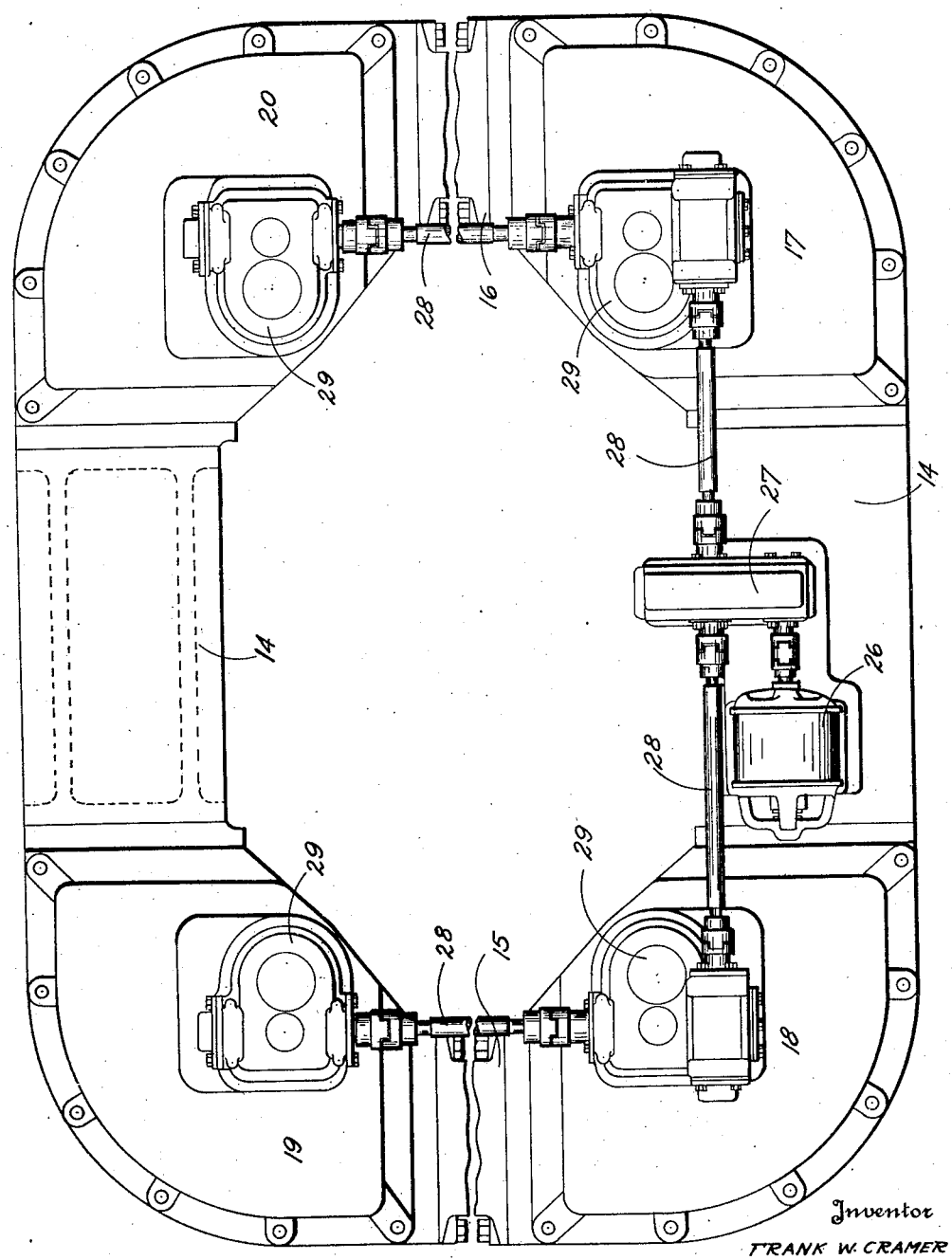
Figure 2 is a top plan view of the supporting housing of the welding unit.

With reference to Figures 1, 2 and 3 the welder 2 comprises the base 5 from the corners of which columns 12 extend upwardly, being secured to the base by bolts 13. These columns are hollow and are connected at their upper ends by cross heads 14 and in addition thereto the girders 15 and 16. The columns carry heads 17, 18, 19 and 20. Guides 21 are formed on the inner angle of the columns 12 and are adapted to receive the corners of a carriage 22. The carriage 22 is supported on screws 23 between the guides 21, the corners thereof extending into the angle between the sides of the columns and are provided with threaded bushings 24 so that upon rotation of the screws 23 the carriage is raised or lowered. Spacing shims 25 are inserted between the carriage and the guides. The mechanism for raising or lowering the carriage 22 as illustrated in Figure 2 comprises a motor 26 mounted on the cross head 14. Through suitable reduction gearing 27 and shaft and couplings 28 the motor 26 drives four double worm reduction gears 29 which actuate the screws upon which the carriage 22 is supported.

The carriage 22 carries a transformer 30. A housing 32 surmounts the transformer 30 and encloses a suction fan 33 which is adapted to transmit a cooling medium to the transformer. The fan 33 draws clean, cool air through a filter (not shown) up through the hollow columns 12, girders 15 and 16 and through ducts 34 extending from the girders 15 and 16 to the housing 32. The ducts 34 are preferably provided with a sliding fit with the girders to permit the cooling mechanism to be raised and lowered with the transformer. Brackets 35 afford auxiliary supports for the ducts 34.

Secured to the carriage by bolts 36, Figures 4 and 5 and depending therefrom are brackets 37, the lower extremity thereof forming bearing boxes 38 within which is disposed the bearings 39. The bearings 39 are adapted to receive the opposing ends of a shaft 40. Keyed to the shaft 40 but insulated therefrom are the electrodes 41 and 42. The electrodes 41 and 42 have disposed therebetween suitable insulating material 41' and are bolted together as at 43 to form a unitary structure. Each electrode is provided with a hub 44 through which the current is introduced.

The terminals of one polarity of the secondary windings of the transformer 30 are connected to the plate 45 and the terminals of the opposite polarity are connected to the plate 46 through suitable leg members 31. The plates 45 and 46 rest on the carriage 22 being insulated therefrom as shown at 46' and from each other as at 45'. Brackets 47 and 48 are bolted to the plates 45 and 46 respectively and carry a plurality of brush holders 49. The brush holders 49 are slidably secured in slotted guides 50 in the brackets 47 and 48, wedging members 50a adjustable through screws 51a are effective to rigidly maintain the brush holders 49 in the guide 50 to provide a structure which when adjusted presents a substantially unitary structure for all purposes avoiding the presence of any loose members in the assembly which would cause variations of magnitude of current. An adjustable screw 51 is provided for effecting the desired pressure between the brush 52 carried by the brush holders 49 and the hub 44 of the electrodes.

Each brush holder 49 has a head portion which carries the brushes and a shank or slide portion which is slidable between guides 50 and which is disposed for movement along a radius of the hub 44. The brushes 52 are laminated, that is, composed of thin copper sheets arranged side by side, and, as Fig. 5 shows, are inclined in the direction of rotation of the hubs 44 at the preferred angle of 30°. This angle may vary a few degrees, that is, about 5° on either side of 30° with satisfactory results, but it should not closely approach either 15° or 45°. At angles of about 15° the laminations are so steeply inclined to the hub that they tend to separate when heavy pressure is exerted on them to press them against the hub so that they can conduct the large currents required for welding thick wall pipe. The laminations also tend to score the hub, to bear with unequal pressure on the hub and thus to cause arcing and burning of the laminations. Wear is also rapid. At angles of about 45° the laminations bend when subjected to heavy pressures and kick up at the toe so that some of the laminations do not contact with the hub.

The angles above referred to may be measured as follows: A radius of the hub is extended thru and beyond a given brush so as to intersect with the longitudinal center line of the brush at its point of emergence from the holder adjacent to the drum.

The angle included between the said center line and the extension of the radius therebeyond should be in the neighborhood of 30° as above set forth. For the sake of brevity, the expression "at an angle of about 30°" has been used in the claims. This expression is intended to mean and include angularities of the brushes in the neighborhood of 30° as determined by the procedure just described.

The disposition of the brushes as above pointed out provides a sliding contact between the brushes and the hub and avoids excessive wear of either of the elements. It will be noted also from the disclosure that the brackets 47 and 48 which carry the brush holders 49 encompass a little more than 180 degrees of the hubs of the electrodes, and that when it becomes desirable to remove the electrodes, it is only necessary to remove one of the brush holders carried by the brackets 47 and 48.

The path of the current is from one pole of the transformer 30 to the plate 45, bracket 47, brush holders 49, brushes 52 to the hub of the electrodes 41, across the seam of the pipe to electrode 42, through the brushes and holders carried by the bracket 48 to the plate 46 and thence to the opposite pole of the secondary of the transformer.

Referring to Figure 3 the feed-in roll stand 1 comprises a housing 55 bolted to the base 5 as at 56. The housing 55 is adapted to slidably carry bearings 57 in which are journalled the shafts 58. The shafts 58 have mounted thereon the rolls 59 which engage and drive the pipe through the welding throat and succeeding steps. Suitable driving mechanism including variable speed motor (not shown) is provided for rotating the shafts 58.

Referring now to Figures 3 and 10 there is illustrated the pressure roll unit 3 which is disposed immediately below the electrodes and includes the stand 60 which is secured to the welder base 5 in any suitable manner. The stand 60 carries pressure rolls 61 and 62 which engage the periphery of the pipe and maintain the abutting edges of the pipe blank securely pressed together during the welding operation. The stand 60 is preferably recessed at 63 to receive contacting mechanism which will be described more in detail later.

As the pipe A is fed into the welding throat it first engages a lug 64 which is pivotally mounted on a shaft 65 carried in a bracket 66 in the recessed portion 63 of the pressure roll stand 60. Co-operating with the lug 64 is a rod 67 which effects the operation of a limit switch 68. The limit switch 68 controls the speed for operating the field rheostat of the variable speed motor which drives the feed-in rolls 59 and which is effective in slowing down the speed of the pipe A. As the pipe continues through the welding throat, it engages a pivoted lever 70 having secured thereto the rod 71. The engagement of the pipe with this lever exerts a downward pressure which causes the switch 72 to become effective to introduce current to the primary of the welding transformer 30 which in turn transmits current to the welding electrodes as has been hereinabove described. The pipe at this point (Figure 7) is moving through the welding throat at a comparatively slow speed. This provision is made to allow the welding current to heat up the pipe to the welding point as near to the end of the pipe as is possible to thereby reduce the necessity of cutting off considerable portions of unwelded pipe. As the pipe proceeds through the welding throat it engages the lug 74 corresponding to lug 64 and operates a similar limit switch 75 which is effective to cause the limit switch 68 to become inoperative and the pipe passes through the welding throat at an increased speed or rather at normal welding speed. Figure 8 illustrates the pipe as it is passing through the welding throat under normal welding speed. Figure 9 illustrates the end of the pipe leaving the welding throat, showing the switch 72 operative to break the welding circuit and discontinue the introduction of current into the electrodes 41 and 42.

With reference to Figure 11 the circuits which control the speed of the pipe through the welding throat and the current supplied to the welder is as follows: alternating current is obtained from any suitable source 80 and is passed through a motor generator 81 where it is converted into direct current and is taken to the feed roll drive motor panel 82 from which it is taken to the feed-in roll drive motor 83. The limit switches 68 and 75 are connected in series and effect the control of field current supplied to the motor 83. In the welding circuit current is brought from any suitable source and introduced into the transformer 84 from which it is taken through a voltage regulator 85 and across breakers 86 to the primary 87 of the welding transformer 30, and from the secondary thereof is led to the welding electrodes as has been hereinabove illustrated. The limit switch 72 is effective to open and close the breakers 86 when a suitable length of pipe has caused the closing of the switch.

As will be noted I have provided an automatic control mechanism for welding separate lengths of pipe. It is among the advantageous features of this device that the scrap loss due to the unwelded ends of lengths of pipe is reduced to a minimum. Further it is not necessary to depend on manual labor to effect the operation of the device.

With reference to Figure 12 there is illustrated an enlarged fragmentary view of a pair of electrodes 90 and 91 engaging the opposite sides of the open seam 92 of a pipe blank A and so disposed with relation thereto as to practice my invention. In the welding of heavy gauge pipe blanks it has been found that an effective weld throughout the extent of the abutting edges could be obtained through an equal distribution of heat across the entire radial width of the seam. To obtain this even heating it was found that there was a definite relation between the thickness of the material used, the diameter of the pipe being welded, the location of the electrodes and the pressure of the electrodes at their point of contact with the pipe.

In the welding of pipe of the same composition throughout, it has been found that to obtain an equal heating of the abutting edges the circumferential length of contact of the electrodes with the pipe should include points substantially equidistant from the radial extremities of the abutting edges. The greatest pressure of the electrodes on the walls of the tube should also be exerted at such points. Such a disposition of the electrodes will tend to cause the current to flow more or less uniformly across the seam for its full radial length and thus welding heat will be distributed throughout the extent of the seam. If a line should be drawn between the opposite points 93 (Figure 12) such a line will substantially bisect the radial length of the seam. Such positioning of the electrodes will prevent the welding of just one edge of the abutting surfaces and will insure complete welding of the abutting surfaces for their full radial length.

In those cases where the pipe blank A is of a bi-metallic composition, namely, where a tube is made having an exterior shell of one composition and an interior shell of a different composition, the electrodes should be so disposed with relation to the opposite sides of the seam, that the points of greatest pressure, should be such that the path from these points to the radial extremities of the seam cleft should offer substantially equal resistance to a flow of electricity therealong. It is believed that in such cases an equal distribution of heat can be distributed across the seam cleft and effect a good weld throughout the radial extent of the seam.

Figure 12 which shows fragmentary portions of electrodes and a 7 inch diameter pipe having a wall thickness in the neighborhood of ⅜ inch, an arrangement of electrodes and a correlation of the factors of electrode width and length of contact measured circumferentially of the pipe and thickness of the pipe and points of great pressure between the points and electrodes, is illustrated. It will be noted from this figure that the electrodes are sufficiently wide to encompass or include points on the exterior surface of the pipe which are substantially equi-distant from the radial extremities of the seam. It will also be noted that a slight clearance between the electrodes and the pipe exists at points adjacent to the seam, that is at the toes of the electrodes. This clearance in actual practice probably never exceeds a very few thousandths of an inch. The heels of the electrodes, that is those portions near the outer sides of the electrodes are in close engagement with the pipe and hence exert the greatest pressure on the pipe. The variation in pressure between electrodes and pipe may be readily accomplished by, for example, trimming the pipe contacting surfaces of the electrodes on a radius of about 3.33 inches for use in welding pipe blanks having an outside diameter of about seven inches. Such trimming insures that the greatest pressure and hence the greatest current flow will occur in areas including said equi-distant points and will render said areas or points effective centers of current distribution to all parts of the seam edges.

It will be noted from Figure 12 that the said equidistant points lie on the exterior surfaces of the pipe, approximately where the exterior surfaces would be intersected by a line which bisects the seam edges.

With reference to Figure 13 my invention is illustrated as applicable to the manufacture of structural shapes and as disclosed to the resistance welding of two plates together to form a T bar. In this application of the invention the welding throat includes three electrodes 95, 96 and 97. Electrodes 95 and 97 are disposed at substantially right angles to electrode 96. The electrode 96 is adapted to engage the upper surface of a plate 98 while the electrodes 95 and 97 engage opposite sides of a plate 99, one edge of which abuts the plate 98. The disposition of the point of greatest pressure of the electrodes on the plate determines the effective heating of the contacting surfaces of the plates. In the illustrated embodiment the point of greatest contact of the electrode 96 will be the mid-point of the seam 100 and on the face of the plate opposite the seam while the effective points of contact of the electrodes 95 and 97 will be aligned and on opposite sides of the plate 99. It is to be assumed that the electrode 96 will be connected to one terminal of the transformer and the electrodes 95 and 97 to the opposing terminal.

Although the foregoing device has been described somewhat in detail it is to be understood that various rearragements and modifications of parts may be resorted to without departing from the scope or spirit of the invention as herein claimed.

I claim:

1. Apparatus for welding open seam thick, large diameter, metal pipe blanks including a welding throat including a plurality of electrodes mounted to contact with the outer surface of a pipe blank, each of said electrodes having a contact area of substantial width and having a portion of said contact area pressed against the outer surface of the pipe with a greater pressure than the remainder of said contact area, said portions being disposed at points on the outer surface of the pipe substantially equidistant from the radial extremities of the abutting surfaces which are to be welded.

2. Apparatus for welding open seam thick, large diameter, metal pipe blanks including a welding throat including a plurality of electrodes mounted to contact with the outer surfaces of the pipe, each of said electrodes having a contact area of substantial width and having a portion of said contact area pressed against the outer surface of the pipe with a greater pressure than the remainder of said contact area, said portions being disposed on opposite sides of the seam at such points that the current flow across the seam will heat all portions of the abutting seam surfaces to welding temperature.

3. Apparatus for welding open seam thick, large diameter, metal pipe blanks including a welding throat including a plurality of rotary electrodes mounted to contact with the outer surface of the pipe, each of said electrodes having a contact area of substantial width and having a portion of said contact area pressed against the outer surface of the pipe with a greater pressure than the remainder of said contact area, said portions being disposed on opposite sides of the seam at such points that the current flow across the seam will be substantially equal over the radial length of the abutting seam surfaces.

4. Apparatus for welding open seam thick, large diameter, metal pipe blanks including a welding throat including means adapted to contact with and conduct welding current to said pipe blank, said means having a contact area of substantial width and having a portion of said contact area pressed against the outer surface of the pipe with a greater pressure than the remainder of said contact area, said portions being disposed on opposite sides of the seam at points substantially equidistant from the radial extremities of the abutting surfaces which are to be welded.

5. Apparatus for electric resistance butt welding a longitudinal seam in a large diameter, thick walled, ferrous metal pipe blank, which includes a pipe-blank-encompassing welding throat composed in part of rotary electrodes positioned to contact with the pipe on opposite sides and adjacent to the edges of the seam, the peripheral surfaces of the electrodes being of sufficient length, as measured circumferentially of the blank, to encompass points on the exterior surface of the blank substantially equidistant from the radial extremities of the seam when the seam edges are in contact with each other, and said surfaces being shaped to exert relatively high pressure on the blank adjacent to such points as compared with other points engaged by the electrodes.

6. Apparatus for electric resistance butt welding a longitudinal seam in a large diameter, thick walled, ferrous metal pipe blank which includes a pipe-blank-encompassing welding throat composed in part of rotary electrodes positioned to contact with the pipe on opposite sides of and adjacent to the edges of the seam, the peripheral surfaces of the electrodes being of sufficient length, as measured circumferentially of the blank, to encompass points on the exterior surface of the blank substantially equidistant from the radial extremities of the seam when the seam edges are in contact with each other, and said surfaces being shaped to apply sufficiently heavy pressure at said points to render them effective centers of current distribution to all portions of the seam edges.

7. The method of making pipe which includes the steps of moving a large diameter, thick wall, tubular, ferrous metal pipe blank having a longitudinal seam lengthwise thru a welding throat, abutting the seam edges, passing welding current across the seam edges more or less uniformly for their full radial length by bringing electrodes into contact with the blank on opposite sides of the seam and including points on the exterior surface of the blank substantially equidistant from the radial extremities of the seam edges, constituting said points effective centers of current distribution to the radial extremities of the seam edges, and welding the seam by pressing the seam edges together with welding pressure while at welding temperature.

8. The method of making pipe which includes the steps of moving a large diameter, thick wall, tubular, ferrous metal pipe blank having a longitudinal seam lengthwise thru a welding throat, abutting the seam edges, passing welding current across the seam edges more or less uniformly for their full radial length by bringing electrodes into contact with the blank on opposite sides of the seam and including points on the exterior surface of the blank substantially equidistant from the radial extremities of the seam edges, exerting greater pressure between the electrodes and the blank closely adjacent to said points than elsewhere, and welding the seam by pressing the seam edges together with welding pressure while at welding temperature.

FRANK W. CRAMER.